United States Patent [19]

Clifford

[11] Patent Number: 5,137,261
[45] Date of Patent: Aug. 11, 1992

[54] PORTED GATE VALVES, METHOD AND APPARATUS

[76] Inventor: Walter A. Clifford, 906 Golf View, Tampa, Fla. 33629

[21] Appl. No.: 533,446

[22] Filed: Jun. 5, 1990

Related U.S. Application Data

[63] Continuation-in-part of Ser. No. 322,669, Mar. 13, 1989.

[51] Int. Cl.$^5$ .............................................. F16K 3/00
[52] U.S. Cl. ................................. 251/328; 251/329; 251/332
[58] Field of Search ............... 251/327, 328, 329, 368, 251/332; 137/15, 312

[56] References Cited

U.S. PATENT DOCUMENTS

| | | | |
|---|---|---|---|
| 2,883,148 | 4/1959 | Williams | 251/328 |
| 2,985,422 | 5/1961 | Anderson et al. | 251/328 |
| 3,000,608 | 9/1961 | Williams | 251/328 |
| 3,207,471 | 9/1965 | Williams | 251/328 |
| 3,333,816 | 8/1967 | Williams et al. | 251/328 |
| 3,442,286 | 5/1969 | Anderson et al. | 251/327 |
| 3,710,816 | 1/1973 | Prince | 251/327 |
| 3,844,531 | 10/1974 | Grengs | 251/329 |
| 3,921,957 | 11/1975 | Freeman | 251/327 |
| 4,054,978 | 10/1977 | Freeman et al. | 251/329 |
| 4,257,447 | 3/1981 | Clarkson | 251/375 |
| 4,377,274 | 3/1983 | Mayhew Jr. | 251/327 |
| 4,541,453 | 9/1985 | Graf et al. | 251/327 |
| 4,588,164 | 5/1986 | Kemp | 251/327 |
| 4,688,597 | 8/1987 | Clarkson et al. | 251/327 |

FOREIGN PATENT DOCUMENTS

| | | | |
|---|---|---|---|
| 115283 | 2/1958 | France | 251/327 |
| 762830 | 12/1956 | United Kingdom | 251/328 |

Primary Examiner—John Rivell
Assistant Examiner—L. R. Leo
Attorney, Agent, or Firm—Dominik, Stein, Saccocio, Reese, Colitz and Van Der Wall

[57] ABSTRACT

An improved gate valve comprising spaced parallel housing walls having axially aligned apertures therethrough and constituting a housing; sleeves removably coupled to the housing walls and defining an annular space therebetween; a gate plate in sliding contact with the sleeves reciprocable between open and closed positions and defining a primary seal to atmosphere between the gate plate and sleeves; packing located adjacent to the upper edges of the housing walls through which the gate plate reciprocates between open and closed positions and defining a secondary seal to atmosphere between the gate plate and the packing; and means associated with the periphery of the housing walls to retain flowing fluid within the housing walls.

5 Claims, 5 Drawing Sheets

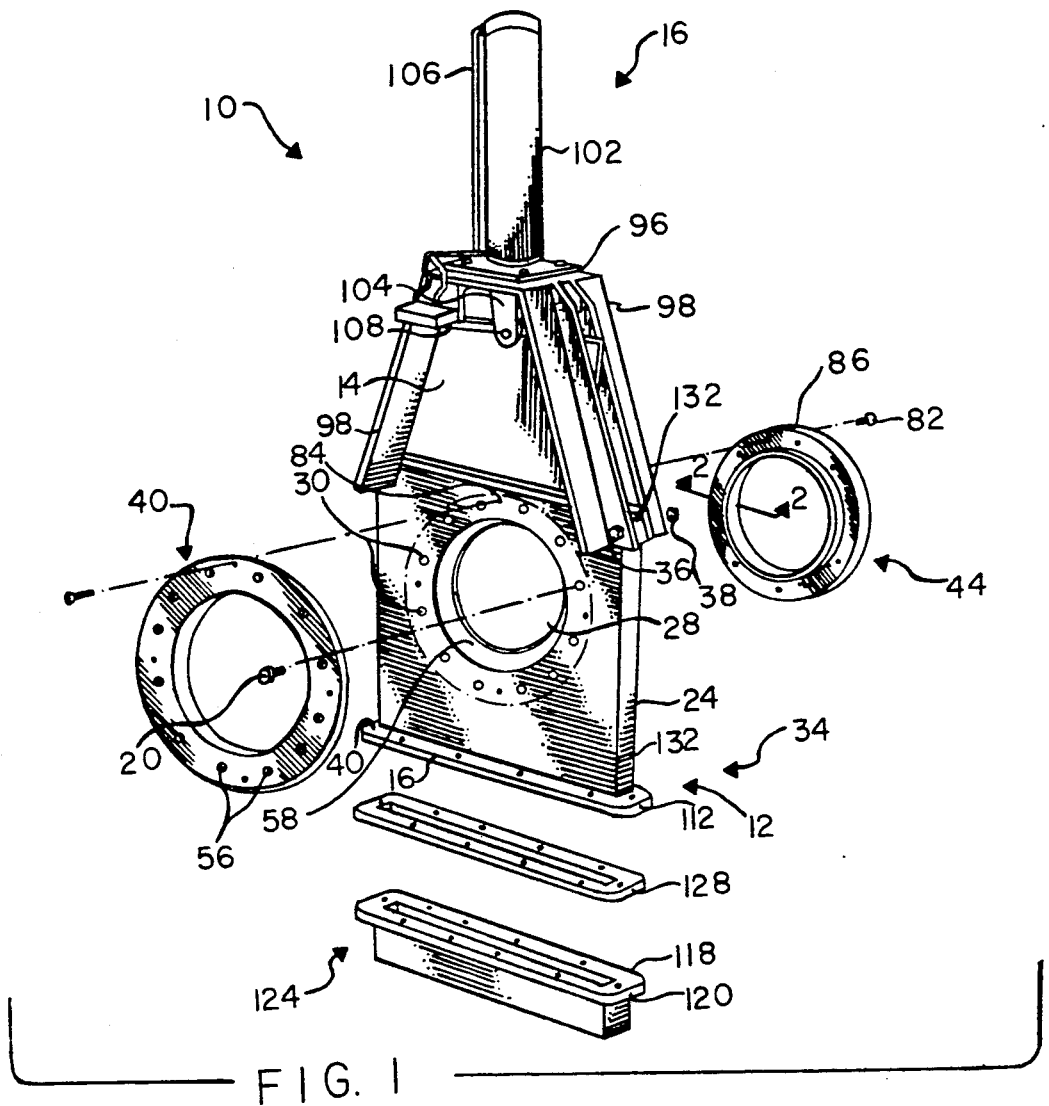
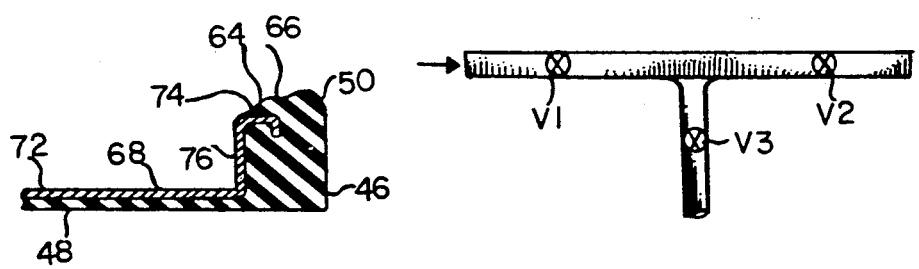
FIG. 1
FIG. 2
FIG. 6 (PRIOR ART)

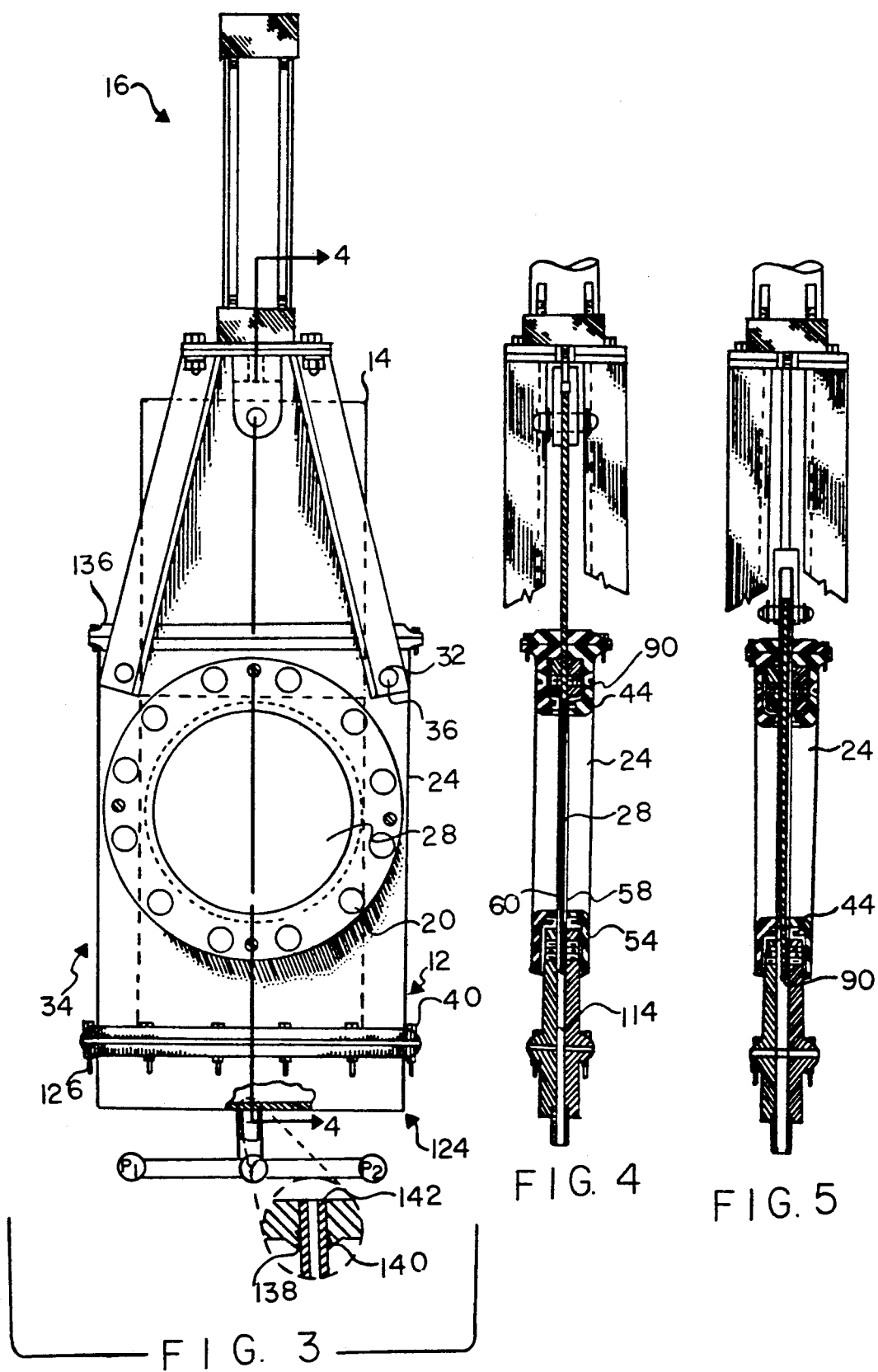

PORTED GATE VALVES, METHOD AND APPARATUS

RELATED APPLICATION

This application is a continuation-in-part application of U.S. patent application Ser. No. 07/322,669 filed Mar. 13, 1989.

BACKGROUND OF THE INVENTION

1. Summary of the Invention

This invention relates to improved ported gate valves and, more particularly, to ported gate valves formed with a primary seal to atmosphere between their gate plate and sleeves and with a secondary seal to atmosphere between their gate plate and packing.

2. Description of the Background Art

In the field of fluid handling, it is a common practice to insert a valve along lengths of pipes so that the flow of fluids through the pipes may be selectively interrupted or continued at the control of an operator. One common type of valve is that formed with an apertured housing and an imperforate, reciprocable plate or gate having a knife edge. Such valves are commonly called knife gate valves or gate valves. The gate with the knife edge is slidably reciprocable into and out of the housing. The housing is coupled to adjacent ends of coupled pipes. When the gate is retracted out of the housing, the valve is open to allow the flow of fluid through the pipes and housing. When the gate is advanced into the housing, the apertures of the housing are blocked by the gate and the flow of fluid through the pipes and housing is precluded. The most common form of knife gate valves are unidirectional with metal seals which do not provide bubble tight shut off. In another form of knife gate valves, that of Clarkson in U.S. Pat. No. 4,257,447, the housing halves on opposite sides of the gate are secured on their axially exterior faces to the pipes while their interior faces are provided with elastomeric sleeves in tight compressive contact when the gate is retracted to ensure the flow of fluid therethrough without leakage. The advancement of the knife edge of the gate to terminate the flow of fluids causes even further compression of the sleeve. Movement of the gate is effected through an actuator thereabove.

In view of the large number of fixed and movable parts to use, operate, maintain and repair, a typical knife valve requires constant attention by a skilled operator. Additionally, the movement of the knife edge of the gate may cause damage to the contacted seal members of the housing upon movement of the gate to the closed position. Further, sealing sleeves in constant high and varying compression as found in knife valves have decreased lives.

A typical knife valve is disclosed in the patent to Clarkson referred to above. Such knife valve suffers from all of the shortcomings as enumerated above. Further, as is typical in many knife valves, the gate slides against metal guide rings which cause excessive wear of the gate as well as of the guide rings thereby necessitating expensive repairs and resulting in costly down time. Such metal to metal contact also accelerates corrosion. In addition, the sealing sleeves of Clarkson are of a multi-piece construction which increases cost, complexity, repair problems, and enlargement of the stock of repair parts.

Modified knife valves of the Clarkson type have also been used. While such modified knife valves have extended utility over those of the type described in the Clarkson patent, most of the above-enumerated shortcomings continued, particularly the sleeve being under heavy compression at all times, as well as the wearing on metal to metal surfaces.

The prior art knife gate valves often have wide faces with increased thickness to accommodate the complex mechanisms within the sleeve. As such, prior art valves may not be of an industry standard size for retrofit purposes. The present invention achieves high performance operations of knife valves while allowing retrofit to the industry standard sizes. The present invention also allows for sleeve replacement without valve disassembly and allows the replacement of the valve to different locations without disassembling the valve or making piping changes.

An optimum assembly would be something new which combines the benefits of the prior practices without their shortcomings, i.e., an assembly which provides for the efficient gating of pipes; convenient and simplified operation, repair, replacement, etc., reliable operation over an extended life of valves and their component elements; and economical cost to manufacture operate, maintain and repair.

As illustrated by a great number of prior commercial devices as well as patents, efforts are continuously being made in an attempt to improve valves whereby pipes may convey fluids more efficiently, conveniently, reliably and economically. None of these previous efforts, however, provides the benefits attendant with the present invention. Additionally, prior valves do not suggest the present inventive combination of component elements arranged and configured as disclosed and claimed herein. The present invention achieves its intended purposes, objectives and advantages over the prior art devices through a new, useful and unobvious combination of component elements, with the use of a minimum number of functioning parts, at a reduced cost to manufacture, and by employing only readily available materials.

Therefore, it is an object of this invention to provide an improved gate valve comprising spaced parallel housing walls having axially aligned apertures therethrough and constituting a housing; sleeves removably coupled to the housing walls and defining an annular space therebetween; a gate plate in sliding contact with the sleeves reciprocable between open and closed positions and defining a primary seal to atmosphere between the gate plate and sleeves; packing located adjacent to the upper edges of the housing walls through which the gate plate reciprocates between open and closed positions and defining a secondary seal to atmosphere between the gate plate and the packing; and means associated with the periphery of the housing walls to retain flowing fluid within the housing walls.

It is a further object of this invention to create seals in a ported gate valve with a gate plate in sliding contact with spaced sleeves reciprocable between open and closed positions to define a primary seal between the gate plate and sleeves and with packing located adjacent to the upper edges of housing walls through which the gate plate reciprocates between open and closed positions to define a secondary seal between the gate plate and packing.

It is a further object of this invention to extend the life of gate valves by retaining the elastomeric sealing sleeves out of contact with each other during operation and use.

It is a further object of the invention to eliminate pressure in the body extension and the other parts of the body when the gate plate is in the closed position.

It is a further object of the invention to introduce fluid to, or remove fluid from, the housing of a gate valve.

Lastly, it is an object of this invention to retain conveyed fluids within a gate valve by the use of a lower body extension beneath sealing sleeves spaced from each other.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into an improved gate valve comprising spaced parallel housing walls having axially aligned apertures therethrough and constituting a housing; sleeves removably coupled to the housing walls and defining an annular space therebetween; a gate plate in sliding contact with the sleeves reciprocable between open and closed positions and defining a primary seal to atmosphere between the gate plate and sleeves; packing located adjacent to the upper edges of the housing walls through which the gate plate reciprocates between open and closed positions and defining a secondary seal to atmosphere between the gate plate and the packing; and means associated with the periphery of the housing walls to retain flowing fluid within the housing walls.

An inter-seal zone is formed between the primary and secondary seals. The housing walls may be formed of cast ductile iron, stainless steel, or formed of fabricated material. The packing constitutes an adjustable seal. The packing includes a cap plate adjustably coupled by bolts to the upper edges of the housing walls and with a slot through which the gate plate reciprocates and with depending fingers in contact with packing material for adjusting the secondary seal with respect to the gate plate. The sleeves are annular and fabricated of an elastomeric material with a rigid annular stiffening ring totally encased within the elastomeric material. The stiffening ring is fabricated of plain carbon steel or plastic.

In addition for the purposes of summarizing the invention, the invention may also be incorporated into a gate valve having a pair of parallel walls with aligned apertures for the flow of fluid therethrough, a gate plate moveable between a closed position for blocking the flow of fluid therethrough and an open position for permitting the flow of fluid therethrough, sealing members secured in the apertures to effect the closure of the apertures to the passage of fluids and peripheral means around the edges of the walls to seal the fluid within the valve.

In addition, for the purposes of summarizing the invention, the invention may also be incorporated into a gate valve comprising housing walls secured together in face to face relationship with an aperture extending through each housing wall in alignment about a central axis and defining a chamber therebetween; a gate plate reciprocable between an open position and a closed position; annular sleeves fabricated of an elastomeric material having a radially extending portions for receiving flanges of pipes to be coupled thereto and having sealing projections positioned in operative association with the apertures and extending into the chamber a predetermined distance to define an annular space therebetween, the sleeves being out of contact with each other when the gate plate is in the open position by a distance less than the thickness of the gate plate, each sleeve having a rigid annular supporting member embedded therein extending into the sealing projection, the sealing projections and gate plate, when in the closed position, forming a primary seal to atmosphere; packing means removably coupled to the upper edges of the housing walls and cooperable with the gate plate for forming a secondary seal to atmosphere; and means along the sides and bottom of the housing walls to retain conveyed fluids within the housing.

In addition, for the purposes of summarizing the invention, the invention may also be incorporated into a gate valve comprising housing walls secured together in face to ace relationship with an aperture extending through each housing wall in alignment about a central axis and defining a chamber therebetween; an imperforate gate plate reciprocable between an open position wherein the gate plate is located above the apertures and closed position wherein the gate plate is located between the apertures, the lower edge of the gate plate being beveled symmetrically from the opposed gate plate faces; annular sleeves fabricated of an elastomeric material for being contacted by flanges of pipes to be coupled thereto and having sealing projections positioned in operative association with the apertures and extending into the chamber a predetermined distance to define an annular space therebetween, the sleeves being out of contact with each other when the gate plate is in the open position by a distance less than the thickness of the gate plate, each sleeve having a rigid annular supporting member embedded therein extending into the sealing projection, the sealing projections and gate plate, when in the closed position, forming a primary seal to atmosphere; packing means removably coupled to the upper edges of the housing walls forming a secondary seal to atmosphere; and a lower body extension removably coupled therebeneath for retaining conveyed fluid within the valve. The lower most center portion of the lower body extension is provided with a threaded collar for receiving a pipe with an aperture formed thereabove. The housing walls are integrally formed with an annular apertured flange aligned with a mating apertures flange on the upper extent of the lower body extension for the removably coupling therebetween.

In addition, for the purposes of summarizing the invention, the invention may also be incorporated into a gate valve comprising housing walls secured together in face to face relationship with an aperture extending through each housing wall in alignment about a central axis and defining a chamber therebetween; an imperforate gate plate reciprocable between an open position wherein the gate plate is located above the apertures and closed position wherein the gate plate is located between the apertures; annular sleeves fabricated of an elastomeric material and having sealing projections positioned in operative association with the apertures and extending into the chamber a predetermined distance to define an annular space therebetween independent of the position of the gate plate, rigid supporting members associated with the sleeves extending into the annular space whereby the annular projections and contacted gate plate form a primary seal; and a lower body extension removably coupled therebeneath to seal conveyed fluid within the housing.

The sleeves are out of contact with each other when the gate plate is in the open position by a distance less than the thickness of the gate plate. The lower edge of the gate plate is beveled symmetrically from the opposed gate plate faces. The gate valve further includes means associated with the lower body extension to add fluid to, or remove fluid from, the space between the housing walls. The lower most center portion of the lower body extension is provided with a threaded collar for receiving a pipe. The housing walls are integrally formed with an annular apertured flange aligned with a mating apertured flange on the upper extent of the lower body extension for the removable coupling therebetween.

In addition, for the purposes of summarizing the invention, the invention may also be incorporated into a gate valve comprising housing walls secured together in face to face relationship with an aperture extending through each housing wall in alignment about a central axis and defining a chamber therebetween; a gate plate having an imperforate section and a section with an aperture extending therethrough and reciprocable between an open position wherein the gate plate is located with its aperture aligned with the apertures of the housing walls and a closed position wherein the imperforate section of the gate plate is located between the apertures of the housing walls; annular sleeves fabricated of an elastomeric material for being supported by flanges of pipes to be coupled thereto and having sealing projections positioned in operative association with the apertures of the housing walls and extending into the chamber a predetermined distance to define an annular space therebetween independent of the position of the gate plate, each sleeve having a rigid annular supporting member in association therewith extending into the sealing projection; a lower body extension removably coupled therebeneath to seal conveyed fluid within the housing; and an extension member having an upper end coupled with respect to the lower end of the housing walls and a lower end secured with respect to the upper end of the lower body extension for receiving the lower section of the gate plate when in the lower position.

Lastly, the invention may be incorporated into a method of cleaning a ported gate valve comprising the steps of providing an improved gate valve comprising spaced parallel housing walls having axially aligned apertures therethrough and constituting a housing; sleeves removably coupled to the housing walls and defining an annular space therebetween; a gate plate in sliding contact with the sleeves reciprocable between open and closed positions and defining a primary seal to atmosphere between the gate plate and sleeves; packing located adjacent to the upper edges of the housing walls through which the gate plate reciprocates between open and closed positions and defining a secondary seal to atmosphere between the gate plate and the packing; and means associated with the periphery of the housing walls to retain flowing fluid within the housing walls; and injecting a cleansing fluid into the inter-seal zone for cleaning purposes.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception of the disclosed specific embodiments may be readily utilized as a basis of modifying or designing other structures and methods for carrying out the same purposes of the present invention. It should also be realized by those skilled in the art that such equivalent structures and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is an exploded perspective illustration of a gate valve constructed in accordance with the principles of the present invention;

FIG. 2 is a sectional view through one of the sleeves taken along line 2—2 of FIG. 1;

FIG. 3 is an elevational view of the gate valve shown in FIG. 1;

FIGS. 4 and 5 are partial, sectional views taken along line 4—4 of FIG. 3 but showing the gate valve in an assembled orientation with the gate plate retracted and advanced respectively.

FIG. 6 is a schematic illustration of a prior art double block and bleed system.

Similar referenced characters refer to similar parts throughout the several Figures.

DETAILED DESCRIPTION OF THE INVENTION

Figure 7:
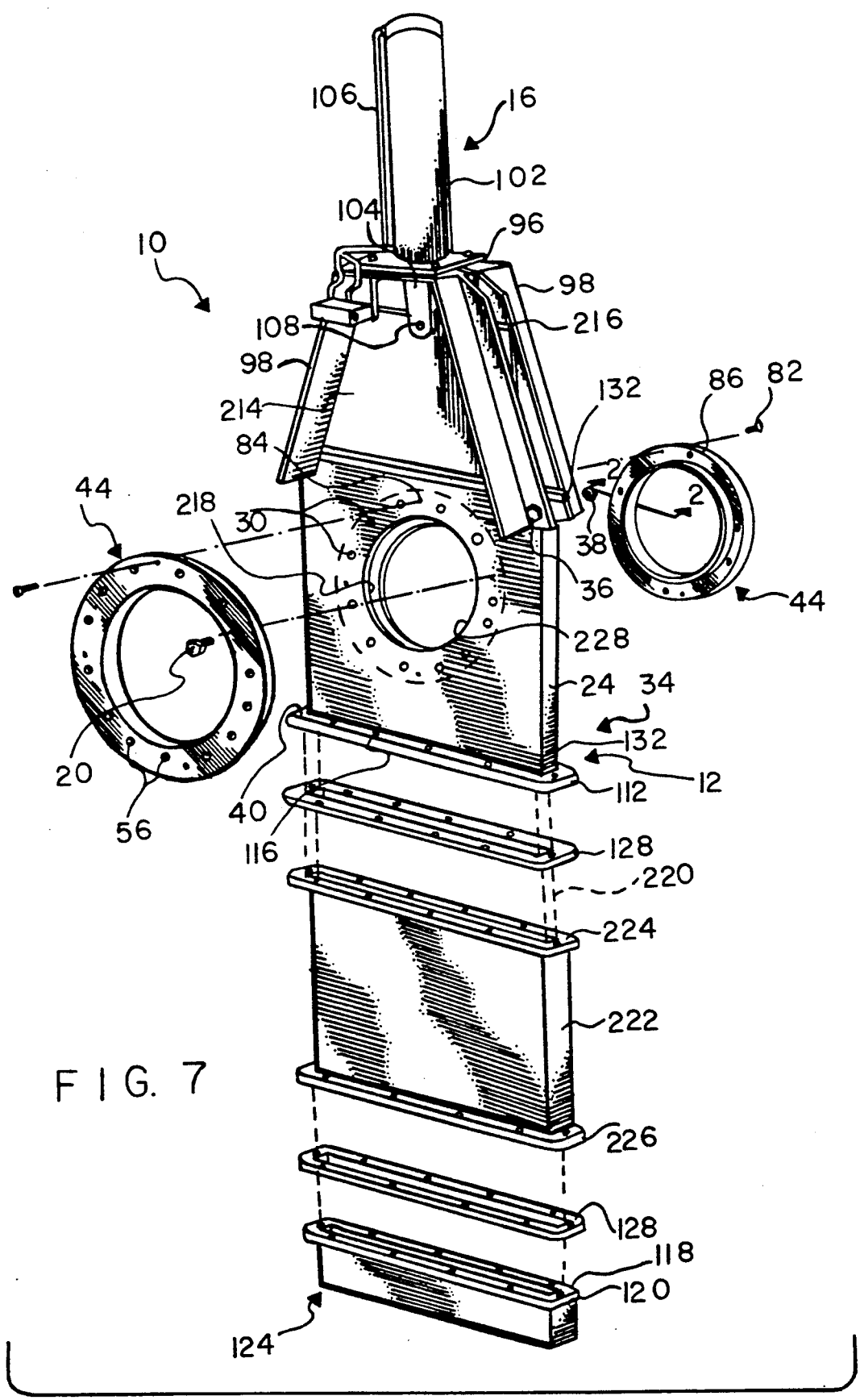
FIG. 7 is an exploded schematic illustration of a gate valve constructed in accordance with an alternate embodiment of the invention.

As can be most clearly seen in FIG. 1, the present invention is shown as a gate valve assembly 10 which includes a fixedly positioned housing 12, a gate plate 14 slidable within the housing, and an actuator 16 secured to the housing and operatively coupled to the gate plate. Together, these major components constitute the gate valve 10 which is positionable between adjacent flanged pipes, not shown, or the like for allowing the flow of fluids through the pipes or for precluding the flow of fluids therethrough.

The ends of the pipes to be coupled to the housing are adapted to be secured thereto as by cap screws 20 or the like in the disclosed embodiments. The pipes at their adjacent portions are formed with flanges with spaced holes symmetrically arranged in a conventional circular orientation for receiving the cap screws whereby the pipes may be coupled and uncoupled to the gate valve as may be desired. Since the pipes are generally stationary during operation and use, they couple with the housing which is also stationary during operation and use.

The housing is formed of spaced, parallel housing walls 24 of similar configuration. Each wall is generally rectangular and is provided with a central aperture 28 for the flow of fluids therethrough. The walls are formed with a lower flanged portion 40 which are preferably manufactured by casting as a single unit to constitute the upper housing assembly 34. Also formed in each plate are radially exterior threaded holes 30 in a conventional circular pattern corresponding in location to the apertures of the flanges of the pipes to be coupled thereto. Unthreaded holes 32 are provided in the upper two corners of the housing walls for the passage of elongated corner bolts 36 therethrough with nuts 38 to provide an arrangement for coupling the valve to the actuators.

Also part of the housing are a pair of similarly shaped annular sealing sleeves 44. The sleeves are formed with a first part 46 fabricated of an elastomeric material. Each first part includes in a washer-like portion 48 on its axially exterior extents. Each first part also includes an axially extending interior seal portion or projection 50 having an exterior diameter of a size to be received in, and effectively line, the aperture 28 of a housing plate. The flat exterior washer-like portion 48 of the first part 46 of each sleeve 44 is adapted to be positioned over the exterior face 54 of its associated housing wall adjacent to its aperture. The washer-like portion 48 extends radially outwardly from the housing wall aperture 28 and is provided with holes 56 located to correspond to the threaded holes 30 of the housing walls and the flanges of the pipes to be coupled thereto. These washer-like portions function as gaskets between the housing walls and their associated pipes.

The second portion of each sleeve 44 is the radially interior sealing projection 50 which is formed integrally with the washer-like portion. Associated sealing projections 50 extend inwardly into the chamber 58 and are of a length greater than the thickness of the housing plates. Associated sealing projections are correlated with the thickness of the spacers and housing walls so that when the housing walls are coupled the sealing projections will form an annular space 60 with the adjacent ends of the sealing projections separated a distance slightly less than the thickness of the gate plate 14. The facing free ends or faces 64 of the sealing projections are essentially flat with rounded edges 66 extending therefrom. The distance between the facing free ends is between about 20 to 40 percent of the thickness of the gate plate when measured prior to the gate plate being positioned between the sealing projections. For example, when 12 inch diameter pipes are coupled with a 12 inch diameter gate valve, a gate plate with a thickness of 0.375 inches would be utilized. An interference of 0.125 inches between the sealing projections and the gate plate would provide a desired sealing relationship. Larger or smaller diameter pipes and gate valves could, of course be utilized, with larger or smaller gate plates along with appropriate interference between the sealing projections and the gate plates.

The relationship between the thickness of the gate plate and the distance between the free edges of the sealing projection portions may be seen by comparing FIGS. 4 and 5, sectional views with the gate plate raised and lowered.

Each sealing sleeve 44 is effectively a one-piece unitive member for reduction of cost and ease of repair of the gate valve. In addition to the elastomeric first part 46 as described above, an additional or second part is also preferably utilized. This second part is the rigid, preferably metallic, L-J-shaped stiffening ring 68. The stiffening ring is a member fabricated into the elastomeric first part 46 to add rigidity and life to the sealing sleeve 44. It includes an annular flat L-shaped segment 72 adhered to the radially interior face of the first part 46 and a J-shaped segment 74 extending axially interiorly therefrom. Together they form an L-J ring 68. The longer leg 76 of the J-shaped segment is adhered to the radially exterior edge of the sealing projection 50 while the remaining curved segment 78 is molded into the sealing projection 50. In this manner, the gate plate may be slid against the opposed interior faces 64 of the sealing projections which are sufficiently resilient to effect a bubble tight seal when the gate plate is in the closed position. Strength is provided to the elastomeric first part 46 of the sealing sleeve by virtue of the rigid, metallic, L-J stiffening ring 68. The composite sealing sleeve 44 is effectively a one piece member for convenience during repair or reconstruction, eliminating all metal to metal sliding contacts.

Short cap screws 82 extend through threaded holes 84 in the sleeve at symmetrically spaced locations for being threadedly received in the threaded holes 84 in the housing walls through holes 86 in the sleeve. These short cap screws with their associated threaded holes will position the sealing sleeves in proper position on the housing walls prior to the coupling of the pipes thereto. The holes 56 in the sleeve, having been positioned by the short cap screws 82, will be oriented to align with the holes 30 of the housing walls as well as the holes of the flanges of the pipes so that when cap screws 20 are positioned through the holes of the flanges of the pipes to be coupled and the holes 56 of the sleeves, they may be threadedly received in the threaded holes 30 of the housing plates.

The gate plate 14 is an imperforate rectangular piece of strong, corrosion resistant material such as stainless steel. The gate plate 14 is located within the chamber 58 in sliding contact with the free faces 64 of the sealing projections 50. It is reciprocable from an upper or retracted position out of contact with the sealing projections 50. The gate plate 14 is also reciprocable to a lower or advanced position wherein the gate plate is positioned to block the flow of fluid through the pipes and the gate valve 10. The retracted position is illustrated by the solid line showing of FIGS. 1, 3 and 4. The advanced position is shown in FIG. 5. A beveled edge 90 is formed on its lower edge to aid entry of the gate plate 14 to between the sleeves form its raised orientation.

The actuator 16 is located above the housing 12 and gate plate 14. This actuator has an intermediate horizontal support plate 96 with four depending section of channel iron 98. The sections of channel iron are fixedly positioned at their lower ends to the upper elongated corner bolts 36 of the housing. The upper portions of the channel iron are coupled to the underside of the horizontal support plate 96 in the conventional manner.

Mounted to the horizontal plate 96 and extending upwardly therefrom is a pneumatic actuator cylinder 102 supporting an axially reciprocable actuator rod 104. The rod has a piston, not shown, at its upper end reciprocable within the cylinder between the lower advanced position and the upper retracted position. An actuator line 106 is coupled with conventional control mechanisms to drive, pneumatically or hydraulically, the piston and, consequently, the actuator rod between the upper open position and the lower closed position all in the conventional manner. The lower end of the actuator rod 104 is releasably coupled to the upper end of the gate plate through a releasable pin 108 for movement of the gate plate concurrently with the movement of the actuator rod. In this manner, the movement of the gate plate is effected by an operator to move the gate plate between an upper position where fluid may flow through the pipes and gate valve and a closed position precluding the flow of fluid therethrough. Movement of the gate plate and its control may also be done manually.

As can be seen in the various Figures, the lower portions of the housing walls are formed with an enlarged flange 112 formed in the lower extents of the housing walls in an annular configuration with an aperture 114 therethrough. The lower face 116 of the flange is planar and is in mating engagement with an upwardly facing upper face 118 of a flange 120 which constitutes the upper extent of the lower body extension 124. Bolts 126 extend through aligned bolt holes in the flanges to separately couple the upper housing assembly 34 with the lower body extension 124. A sealing gasket 128 is provided between the faces of the flanges. The lower body extension 124, like the upper housing assembly 34, is also preferably cast.

The lower body extension is necessary since the annular sleeves 44 are out of contact with each other when the gate plate 14 is raised. As such, the lower body extension 124 is normally full of the fluid being fed. The sides of the housing walls are sealed by vertically extending casting material 132 extending from the upper edges of the housing walls 24 downwardly to the flanged portion 40. The casing material is cast into the housing at the vertical edges of the housing walls only thus leaving its upper edge and central extent open. The upper edge of the housing is conventionally provided with a packing member 136 to totally seal the gate valve around the periphery of the housing walls. The packing member is releasably supported by mating flanges, bolts similar to that at the lower body extension 124 but without a gasket.

As can be seen in the various drawings, the lower edge of the gate plate is formed as a beveled edge 90 with equally angled bevels extending from opposed surfaces of the gate plate. This differs from standard knife edges of the gate valves where the bevel of the knife edge is on one surface only to couple with fixed receiving surfaces beneath the housing plate. In such prior art constructions, the gate plate is urged in one direction or the other to thereby render such prior art devices unidirectional, i.e., the sealing occurs only if the fluid is flowing in one predetermined direction. The present invention has its sealing engagement generated totally by the contract between the gate plate and the annular sleeves thereby rendering the present device bidirectional in its sealing capabilities. This arrangement also allows for removal of the packing member 136 and/or lower body extension 124 when the gate plate is closed and the valve is in service.

The present invention in so far as has been described is essentially the same as that described in applicant's U.S. Pat. No. 4,765,361 to Clifford except for the modified gate plate, the lower body extension and packing necessitated by the shortened gate plate.

Cast in the lower body extension, centrally in its lower most extent, is an extension collar 38 with internally formed threads 140. This is to allow the drilling of a hole 142 into the lower most extent of the lower body extension above the collar 138, if desired, to render it a source for feeding conveyed fluids to or from the housing through a pipe coupled to the threads. Such an arrangement finds utility in certain situations such as double block and bleed operations. In double block and bleed operations of the prior art, the flow of combustible fluid to a hazardous location such as a burner room may have to be periodically terminated to allow working in the room with an atmosphere free of dangerous fluids. In such an operation, the flow of hazardous fluids to the room would have to be terminated with great assurance. During such operation it was the practice to provide a second valve V2 downstream from the first valve V1 and with a supplemental line extending from between the two valves. The supplemental line would be provided with a third valve V3 so that the first valve V1 could be closed and the second valve V2 could also be closed. The third valve would be open to convey away from the hazardous room any inadvertent leakage through the first valve V1. By employing the valve of the present invention, the second and third valves could be eliminated by closing off the gate valve 10 and opening a Y-valve Y along the pipe from the lower body extension so that any inadvertent leakage through the valve of the present invention would be conveyed away in the intended fashion.

The present invention allows for sealing on both sides of the gate plate. Thus, in a double block and bleed situation, if one of the sealing members were to become unseated or inoperative for one reason or another, the operative sealing member would still function. Fluids could feed out between the defective seal and the adjacent face of the gate plate and out the bottom of the lower body extension. This is because both of the seals function independently of each other.

The present invention also includes a Y-valve at the bottom of the pipe. The Y-valve allows coupling of the lower body extension and interior of the valve with either a positive pressure source P1 or a negative pressure source P2. In the positive pressure source mode, a source of air or other liquid may be injected into the housing as for cleaning purposes. In dry service applications, the air will purge and fluidize the material for cleaning the parts movable with respect to each other. A liquid purge may also be utilized for internal cleaning. Such positive pressure mode may also be used simply to add a dilutant fluid to the fluid being conveyed. The negative pressure mode may include a vacuum or simply ambient pressure again, as for cleansing purposes when the valve is closed. This may take the place of the removal of the lower body extension for total cleaning of the space within the housing walls. The negative pressure mode may also be used as an isolator for sample material to verify the contents being conveyed through the valve.

Shown in FIG. 7 is a gate valve constructed in accordance with an alternate embodiment of the invention. The upper housing assembly are fabricated as in the primary embodiment. The gate plate itself, however, is not fabricated as a short imperforate gate plate 14 as in the primary embodiment, but rather as an elongated gate plate 214 with an imperforate upper section 216 and with an aperture 218 extending through the lower section 220. As such, when the gate plate is raised as shown in the solid line illustration of FIG. 7, the flow of fluids occurs through the conduits or pipes and through the aperture 218. When, however, the gate plate is lowered, as shown in the dotted line position of FIG. 7, the flow of fluids is interrupted because the imperforate upper section 116 is between the central aperture 228 of the upper housing assembly 34.

Since the lower apertured section 220 of the gate plate 214 extends beneath the upper housing assembly 34 when the gate valve is closed, accommodations must be made for fluidly enclosing the lower section 220 of the gate plate 214. To that end, a hollow elongated spacer 222, equal to or greater in height than the height of the lower apertured section 220 of the gate plate 214, is employed. The spacer 222 has an upper flange 224 for coupling with the lower flange 112 of the upper housing assembly 34. It also has a lower flange 226 for coupling with the flange 120 of the lower body extension 124. Gaskets 128 are preferably utilized above the upper flange 224 and beneath the lower flange 226 of the spacer 222 for maintaining a proper seal for fluids within the gate valve. In this manner, the gate valve of the FIG. 7 embodiment functions essentially the same as that of the primary embodiment except for the spacer 222 and the elongated gate plate 214 which may be utilized in essentially the same manner as described in my aforementioned U.S. Pat. No. 4,765,361 issued Aug. 23, 1988.

As shown in the embodiment of FIGS. 8 through 11, the upper edges of the housing walls are formed with threaded apertures 302 adjacent to their ends. Located thereabove is a cap plate 304 with horizontal flanges 306 having apertures 308 extending therethrough. Such apertures 308 are adapted to be positioned in axial alignment with the threaded apertures at the upper ends of the housing halves. At each end of the cap plate and positioned through the apertures of the housing cap are a pair of adjustment bolts 310 which rae threaded into the threaded apertures of the housing halves. Between the ends of the cap plate, and extending the length thereof, is a central slot 312 through which the gate plate 214 moves between its upper and lower positions for opening and closing the valve.

Along the interior edges of the cap plate adjacent to the slot are downwardly projecting fingers 314 adapted to extend into the upper portion of recesses 316 formed along the upper edge of each housing wall. The lower surfaces 318 of the recesses are angled downwardly and inwardly towards the gate plate. Located within the recesses 316 are a plurality, three in the disclosed preferred embodiment, elongated wads of packing material 320 adapted to form the secondary seal to atmosphere for the assembly. The lower ends of the wadding are in contact with the angled surfaces 318 of the housing walls. The upper ends of the wadding are adapted to be contacted by the lower edges of the fingers 314. The amount of pressure applied downwardly to the packing material 320 may, therefore, be varied by adjusting the bolts to thereby bring the cap plate 304 closer to the housing half. In this manner, after extended use, and after the secondary seal begins to become less effective, the bolts 310 may be tightened. This tightening functions to bring the cap plate 304 downwardly so that its fingers 314 will exert a downward force on the packing material 320 to push the packing into more positive contact with the gate plate 214 due to the angled surfaces 318 of the housing walls.

The packing 320, through which the gate plate 214 reciprocates, constitutes a secondary seal to atmosphere at the upper edge of the housing. The secondary seal, when taken in combination with the sealed side edges and the components at the bottom edge of the housing walls form an inter-seal zone 370 between the housing plates. The inter-seal zone is externally bounded at its sides by the edges of the housing walls, at the bottom by the components at the bottom of the housing walls, and at the top by the packing and gate plate. The inter-seal zone is internally bounded by the sealing sleeves 344 and the gate plate 214 along their circular area of contact on both sides of the gate plate. Such circular area of contact constitutes the primary seal to atmosphere. The inter-seal zone is a single zone extending totally around the circular area of contact and is present in all embodiments of the invention.

Figure 9:
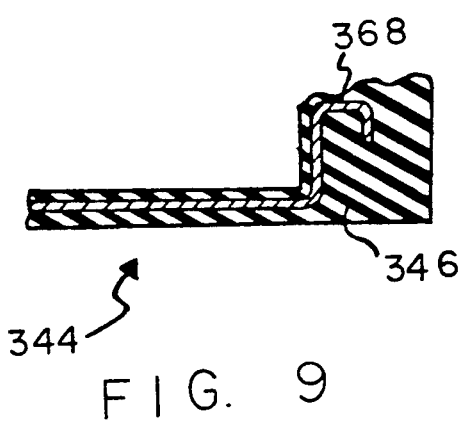
FIG. 9 is a sectional view of the modified sealing sleeve of the FIG. 8 embodiment.

FIG. 9 shows a sealing sleeve 344 which is improved when compared with the sleeve 44 in FIG. 2. In this sleeve 344, the central internal rigid stiffening ring 36 is entirely encased within the elastomeric material 346 of the sleeve. In prior applications, such rigid stiffening ring was formed of a corrosion resistant material such as stainless steel or the like to preclude a life shortened by corrosion due to portions thereof being exposed to corrosive fluid being conveyed. The entire sealing of the stiffening ring 368 within the elastomer 346 allows for the use of less expensive materials for the stiffening ring 368 such as plain carbon steel, hard plastic, or the like to perform this stiffening function since the stiffening ring material is not contacted by the corrosive material being conveyed through the gate valve of the present invention. No need remains to use more expensive materials such as 316 stainless steel or the like as was used in the past.

Figure 10:
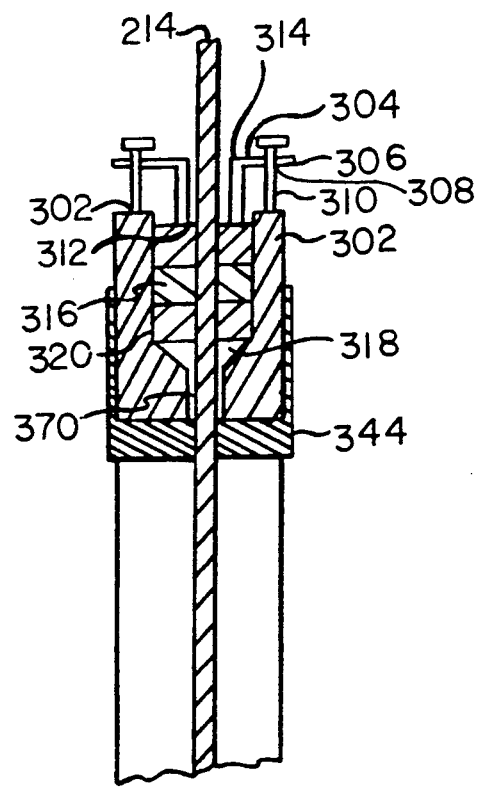
FIG. 10 is a sectional vie of the housing plates and gate plate of FIG. 8 taken vertically through the axis.
Figure 11:
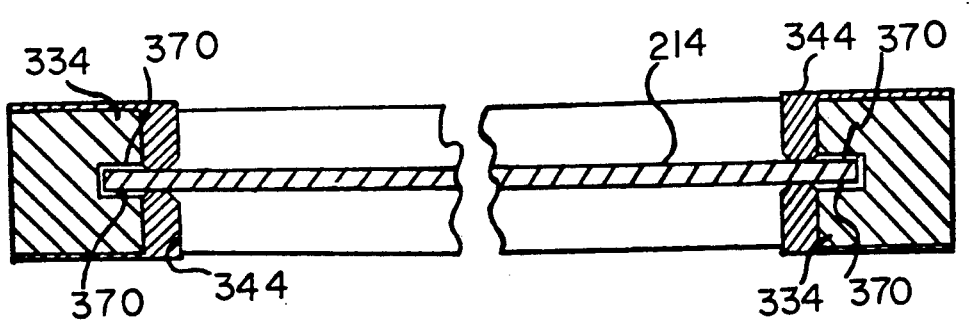
FIG. 11 is a sectional view of the housing plates and gate plate of FIG. 8 taken horizontally through the axis.

It should be understood that the specific improved sleeve of FIG. 9 as well as the specific improved adjustable packing of FIG. 10 may be readily utilized with any of the prior embodiments of FIGS. 1 through 7.

Figure 8:
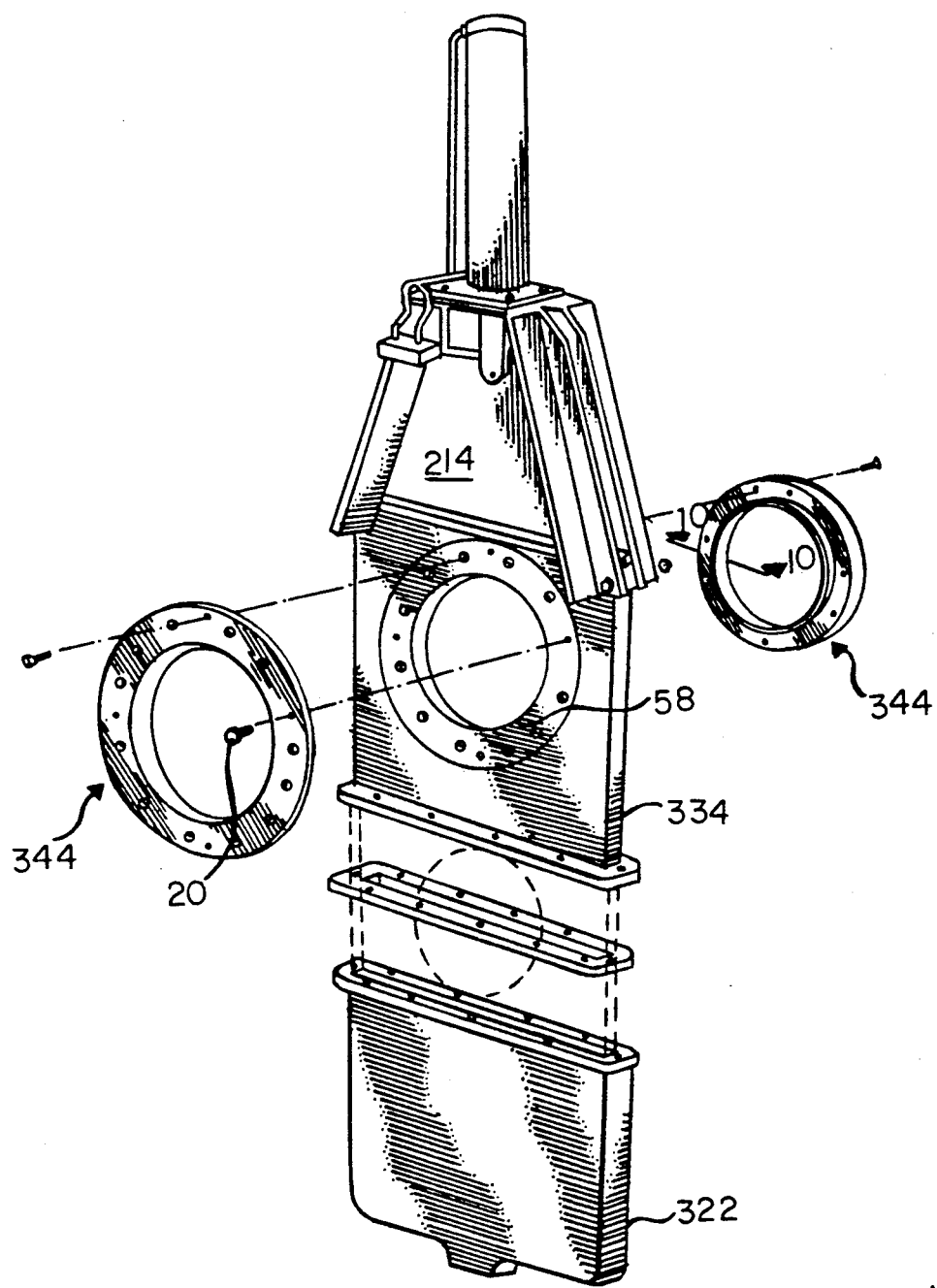
FIG. 8 is also an exploded schematic illustration of a gate valve but constructed in accordance with a further alternate embodiment of the invention.

As can be seen in the FIG. 8 embodiment, the lower housing extension 322 as well as the housing walls 334 ar each cast as one piece members of an inexpensive material such as cast ductile iron, 316 stainless steel, or the like, and not the more expensive carbon steel or the like as was used previously. It has been found that such cost reducing feature is attained when employed in the configuration as disclosed herein. In the cast embodiment, the housing walls are formed integrally with each other through material at the edges of the walls. In the prior fabricated embodiments, the housing walls were separately fabricated and then coupled with spacer material components extending vertically along the side edges of the housing walls. Further, no loss of performance is experienced when functioning with housing materials as described above. Both the commonly cast housing walls and the separately fabricated housing halves with coupling spacers may be used in any of the various embodiments disclosed herein.

With the disclosed embodiments utilizing a gate plate with an apertured section and an imperforate section, the primary seal is always between the sleeves and gate plate and the secondary seal is always at the packing regardless of the position of the gate plate. The packing may by changed without taking the valve out of service and with no disassembly of the valve-to-pipes coupling.

In the disclosed embodiments utilizing a gate plate having no apertured section, the primary seal is between the sleeves and gate plate whenever the valve is the closed position precluding the flow of fluid to the atmosphere. The secondary seal is at the packing. When in such closed position, the packing may be changed without taking the valve out of service and with no disassembly of the valve-to-pipes coupling. When in the open position, the primary seal is at the packing.

The present invention allows for an improved method of operation of the gate valve as disclosed herein. More specifically, when in use, prior gate valves would allow the corrosive fluid being conveyed to contact all parts of the gate valve exposed to the flow of fluid under any conditions. The parts of the gate valve to be contacted by fluid are those areas which define the inter-seal zone between the primary and secondary seal as well as the primary and secondary seals themselves and portions of the gate plate. The present arrangement allows for the coupling of the lower body extension with a forced flow of cleansing fluid, as for example clean water. The water is injected under pressure through the opening in the lower body extension to contact all surfaces within the inter-seal zone, the primary and secondary seals, and the exposed portions of the gate to remove all corrosive material present from prior conveying. The water effecting the cleansing operation is simply conveyed away by being forced by the pressure of the water into the pipes coupled by the gate valve or removed through the application of a second opening in the lower body extension.

The herein described cleaning method may be practiced with any of the previously disclosed embodiments equipped with an aperture in the lower body extension. Further, although this last embodiment of the invention includes an aperture in the lower body extension for cleaning purposes, it should be understood that any of the other disclosed embodiments may be constructed with or without such aperture.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A gate valve comprising:
   housing walls secured together in face to face relationship with an aperture extending through each housing wall in alignment about a central axis and defining a chamber therebetween;
   a gate plate reciprocable between an open position and a closed position;
   annular sleeves fabricated of an elastomeric material having radially extending portions releasably secured to the exterior surfaces of the housing walls for receiving flanges of pipes to be coupled thereto and having sealing projections positioned in operative association with the apertures and extending into the chamber a predetermined distance to define an annular space therebetween, the sleeves being out of contact with each other when the gate plate is in the open position by a distance less than the thickness of the gate plate, each sleeve having a rigid annular supporting member embedded therein extending into the sealing projection, the sealing projections and gate plate, when in the closed position, forming a primary seal to atmosphere;
   packing means removably coupled to the upper edges of the housing walls and cooperable with the gate plate for forming a secondary seal to atmosphere; and
   means along the sides and bottom of the housing walls to retain conveyed fluids within the housing.

2. A gate valve comprising:
   housing walls secured together in face to face relationship with an aperture extending through each housing wall in alignment about a central axis and defining a chamber therebetween;
   an imperforate gate plate reciprocable between an open position wherein the gate plate is located above the apertures and closed position wherein the gate plate is located between the apertures, the lower edge of the gate plate being beveled symmetrically from the opposed gate plate faces;
   annular sleeves fabricated of an elastomeric material releasably secured to the exterior surfaces of the housing walls for being contacted by flanges of pipes to be coupled thereto and having sealing projections positioned in operative association with the apertures and extending into the chamber a predetermined distance to define an annular space therebetween, the sleeves being out of contact with each other when the gate plate is in the open position by a distance less than the thickness of the gate plate, each sleeve having a rigid annular supporting member extending into the sealing projection, the sealing projections and gate plate, when in the closed position, forming a primary seal to atmosphere;
   packing means removably coupled to the upper edges of the housing walls; and
   a lower body extension removably coupled therebeneath for retaining conveyed fluid within the valve.

3. The valve as set forth in claim 2 wherein the lower most center portion of the lower body extension is provided with a threaded collar for receiving a pipe and with an aperture formed thereabove.

4. The valve as set forth in claim 2 wherein the housing walls are integrally formed with an annular apertured flange aligned with a mating apertures flange on the upper extent of the lower body extension for the removable coupling therebetween.

5. A gate valve comprising:
   housing walls secured together in face to face relationship with an aperture extending through each housing wall in alignment about a central axis and defining a chamber therebetween;
   a gate plate having an imperforate section and a section with an aperture extending therethrough and reciprocable between an open position wherein the gate plate is located with its aperture aligned with the apertures of the housing walls and a closed position wherein the imperforate section of the gate plate is located between the apertures of the housing walls;

annular sleeves fabricated of an elastomeric material releasably secured to the exterior surfaces of the housing walls for being supported by flanges of pipes to be coupled thereto and having sealing projections positioned in operative association with the apertures of the housing walls and extending into the chamber a predetermined distance to define an annular space therebetween independent of the position of the gate plate, each sleeve having a rigid annular supporting member in association therewith extending into the sealing projection;

a lower body extension removably coupled therebeneath to seal conveyed fluid within the housing; and an extension member having an upper end coupled with respect to the lower end of the housing walls and a lower end secured with respect to the upper end of the lower body extension for receiving the lower section of the gate plate when in the lower position.

* * * * *